C. D. STROMGREN.
VALVE STEM FITTING DEVICE.
APPLICATION FILED DEC. 7, 1921.
1,435,428.
Patented Nov. 14, 1922.
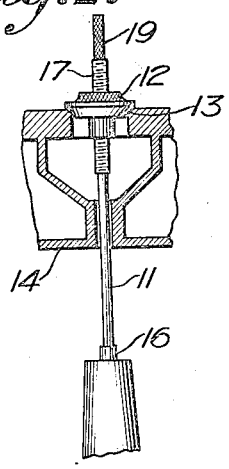
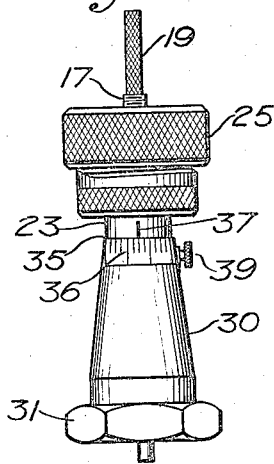
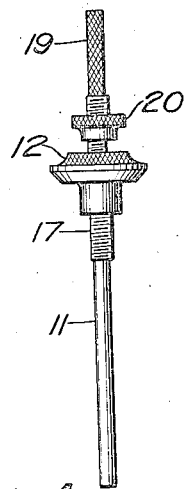
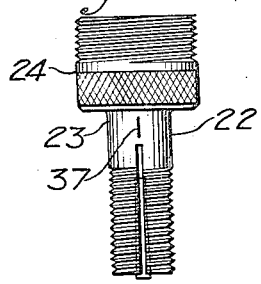
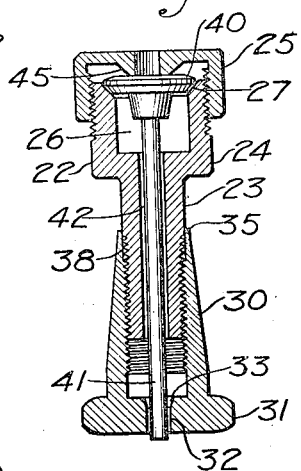
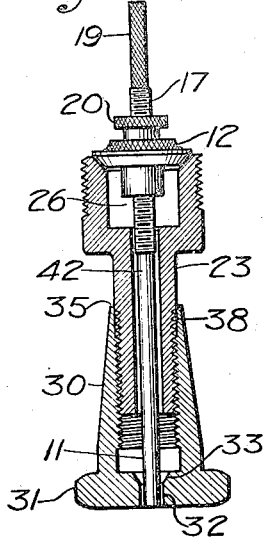
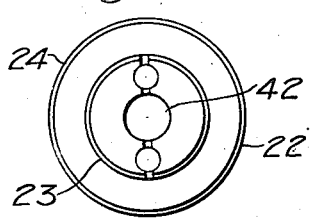
INVENTOR:
CHARLES D. STROMGREN,
BY Graham Harris
ATTORNEYS.

Patented Nov. 14, 1922.

1,435,428

UNITED STATES PATENT OFFICE.

CHARLES D. STROMGREN, OF LOS ANGELES, CALIFORNIA.

VALVE-STEM-FITTING DEVICE.

Application filed December 7, 1921. Serial No. 520,606.

*To all whom it may concern:*

Be it known that I, CHARLES D. STROMGREN, a citizen of the United States, residing at Los Angeles, in the county of Los Angeles, State of California, have invented a new and useful Valve-Stem-Fitting Device, of which the following is a specification.

My invention relates to the assembling and fitting of internal combustion engines, being more particularly a device or fixture for sizing and fitting valve stems for such engines.

It is essential to the efficient operation of the internal combustion engine that the valve stems should be of exactly proper length, otherwise the valves fail to seat properly and a noisy valve action results.

In most of the common types of engines, provision is made for adjustment between the valve stem and push rod, but in the "Ford" type of automobile no such provision is made which emphasizes the need of proper fitting of the valves and nicety of sizing the length of the valve stem.

The common way of fitting valves in "Ford" type engines is to "cut and try" the valve in the engine, it frequently happening that in filing the end of the valve stem too much metal is removed and the valve stem is too short, which defect cannot be remedied unless a new valve stem is substituted.

It is the object of my invention to provide a fitting atttachment by means of which valve stems may be accurately sized and the end of the stem properly squared. This is accomplished by using a gauging device which measures the proper length of valve stem, by placing such device in the engine in place of the valve. This gauging device is then placed in a template which is adjusted to the exact length of the gauging device, the gauging device then being removed and the valve to be fitted placed in the template and the end of the valve stem filed.

Referring to the drawings which are for illustrative purposes only,

Fig. 1 is a side view of a device embodying a form of my invention, the parts being in the assembled position when not in use.

Fig. 2 is a fragmentary vertical sectional view of a part of an internal combustion engine showing the gauging member in place to determine proper length of valve stem.

Fig. 3 is a side elevation of the gauging member.

Fig. 4 is a sectional elevation of the template member showing the gauging member therein as used for setting the template.

Fig. 5 is a view of the template member, similar to Fig. 4, showing the valve in place for the fitting operation.

Fig. 6 is a side elevation of the barrel forming part of the template member, and Fig. 7 is an enlarged inverted plan view of the barrel shown in Fig. 6.

The gauging device 11 consists of a valve member 12 formed to fit a common valve seat indicated at 13 on an engine, part of which is indicated at 14 in Fig. 2, a push rod being also indicated at 16. The valve member 12 is interiorly threaded to receive a threaded rod 17, such rod extending through the valve member 12 and terminating at its upper end in a knurled portion 19.

The gauging device is placed in the engine as shown in Fig. 1 and the rod 17 turned until the valve, being seated, the lower end of the rod 17 rests upon the upper end of the push rod 16. When so adjusted, the valve may be set on the rod by means of a lock nut 20 shown in Fig. 3. This operation gives the exact distance from the valve seat to the upper end of the push rod and the gauging device is placed in the template 22, as hereinafter described.

The template device consists of a barrel 23 having a head 24 formed thereon, such head being exteriorly threaded to receive a cap 25 and having a circular recess 26 which terminates at its outer end in a valve seat 27.

The lower end of the barrel is exteriorly threaded to receive a thimble 30, the lower end of which is shaped to form a nut 31 having a central opening 32 to receive the valve stem, such opening being flared as shown at 33 to guide the valve stem into the opening 32. The thimble is tapered inwardly to an edge 35 marked with a scale 36 which registers with a line or mark 37 on the barrel 23. Preferably by using twenty threads to the inch on the barrel and dividing the scale 36 into fifty parts, readings of a thousandth of an inch may be readily made. To provide an unbroken and distinct edge at the reading line of the thimble, a few of the threads on the thimble are stripped as shown at 38.

After taking the measurement of the valve, as heretofore described, the gauging device is placed in the template as shown in Fig. 4 and the thimble 30 turned on the barrel until the lower end of the rod 17 is flush with the face of the nut 31. The thimble is then operated to shorten the valve stem length approximately two thousandths of an inch which is ascertained by reading the scale 36, and the parts of the template set by means of a set screw 39. The gauging device is then removed and the valve 40 to be fitted is placed in the template as shown in Fig. 5, the valve 40 being seated on the seat 27, the valve stem 41 extends through the central bore 42 of the barrel and through the opening 32 in the thimble. The valve is held in the template device by means of the cap 25 which has an enlargement or boss 45 which engages the top of the valve. The end of the valve stem 41, which extends beyond the thimble, is then filed off flush with the face of the thimble thereby providing a valve of proper valve stem length to fit the engine from which measurement was taken by the gauging device. The flat face of the nut on the thimble forms a working face for the file used, resulting in a squared end on the finished valve stem. The finished valve is removed from the template by removing the cap 25.

When not in use, the gauging device may be placed in the template, as shown in Fig. 1, and the cap placed on the barrel with the rod of the gauging device extending through a central opening 47 in the cap.

I claim as my invention:

1. A valve stem fitting fixture comprising: gauging means for determining the valve stem length; template means adjustable to conform to the valve stem length determined by said gauging means; and means for retaining the valve stem in said template means during the operation of sizing the valve stem.

2. A valve stem fitting fixture comprising: gauging means for determining the valve stem length, said gauging means consisting of a rod and an adjustable valve threaded on said rod the distance between said adjustable valve and one end of the rod determining the valve stem length; template means adjustable to conform to the valve stem length determined by said gauging means; and means for retaining a valve therein during the operation of sizing the valve stem.

3. A valve stem fitting fixture comprising: gauging means for determining the valve stem length, said gauging means consisting of a rod and an adjustable valve threaded on said rod the distance between said adjustable valve and one end of the rod determining the valve stem length; template means adjustable to conform to the valve stem length determined by said gauging means, said template means having a seat therein to receive the valve on said gauging means, and an opening therein to receive the rod; and means for retaining a valve in said template means during the operation of sizing the valve stem.

4. A valve stem fitting fixture comprising: gauging means for determining the valve stem length, said gauging means consisting of a rod and a valve threaded on said rod the distance between said adjustable valve and one end of the rod determining the valve stem length; template means adjustable to conform to the valve stem length determined by the gauging means, said template means consisting of a barrel, a thimble threaded on the lower end of said barrel, and a seat in said barrel; and means for retaining a valve in said template means during the operation of sizing the valve stem.

5. A valve stem fitting fixture comprising: gauging means for determining the valve stem length, said gauging means consisting of a rod and a valve threaded on said rod the distance between said adjustable valve and one end of the rod determining the valve stem length; template means adjustable to conform to the valve stem length determined by the gauging means, said template means consisting of a barrel, a head formed on the upper end of said barrel, a valve seat formed in said head, said barrel having a bore to receive a valve stem, a thimble threaded on the lower end of said barrel, said thimble having an opening therethrough to receive a valve stem, a scale on said thimble registering with marking on said barrel, and a cap threaded on said head arranged to engage a valve seated in said head.

6. A valve stem fitting fixture comprising: gauging means for determining the valve stem length, said gauging means consisting of a rod and a valve threaded on said rod the distance between said adjustable valve and one end of the rod determining the valve stem length; template means adjustable to conform to the valve stem length determined by the gauging means, said template means consisting of a barrel, a head formed on the upper end of said barrel, a valve seat formed in said head, said barrel having a bore to receive a valve stem, a thimble threaded on the lower end of said barrel, said thimble having an opening therethrough to receive a valve stem, and means for retaining a valve on said valve seat.

7. A valve stem fitting fixture comprising: gauging means for determining the valve stem length, said gauging means consisting of a rod and a valve threaded on said rod the distance between said adjustable valve and one end of the rod determining the valve stem length; template means adjustable to conform to the valve stem length determined by the gauging means, said template means consisting of a barrel, a head formed on the upper end of said barrel, a valve seat formed in said head, said barrel having a bore to receive a valve stem, and a thimble threaded on the lower end of said barrel, said thimble having an opening therethrough to receive a valve stem.

In testimony whereof, I have hereunto set my hand at Los Angeles, California, this 1st day of December, 1921.

CHARLES D. STROMGREN.